UNITED STATES PATENT OFFICE.

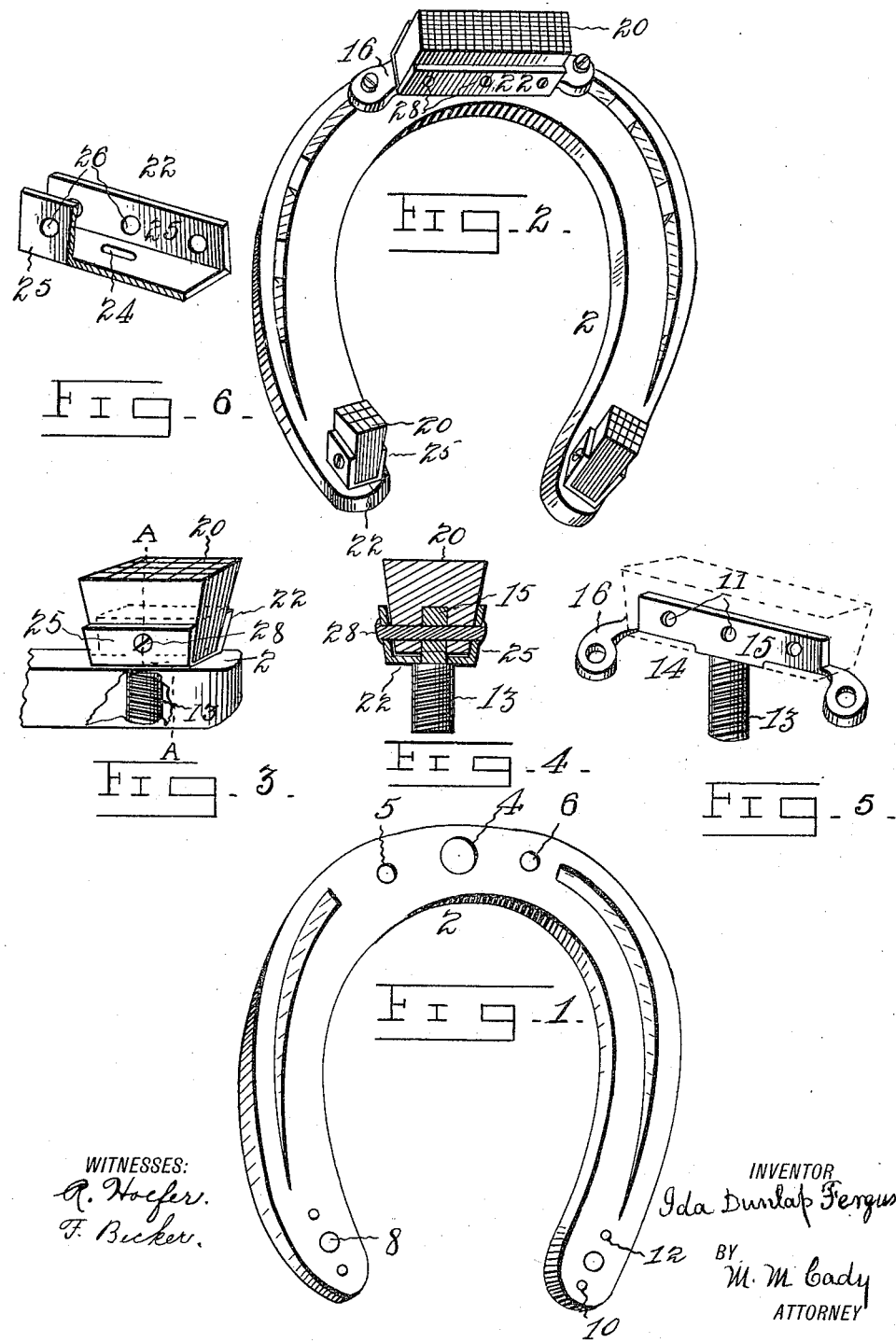

IDA DUNLAP FERGUSON, OF DUBUQUE, IOWA.

HORSESHOE.

1,142,808.  Specification of Letters Patent.  Patented June 15, 1915.

Application filed May 16, 1912. Serial No. 697,613.

*To all whom it may concern:*

Be it known that I, IDA DUNLAP FERGUSON, a citizen of the United States, residing at Dubuque, in the county of Dubuque and State of Iowa, have invented certain new and useful Improvements in Horseshoes, of which the following is a specification.

This invention relates to farriery and more particularly to a removable rubber horse shoe calk.

The principal object of this invention is to provide elastic and noiseless toe pieces and calks adapted to be removably attached to an ordinary horse shoe.

A further object of this invention is to provide removable toe pieces and calks for a horse shoe comprising rubber wear faces fixedly mounted in a suitable receptacle and rigidly secured to the shoe.

Other and further objects of this invention will in part be obvious and will in part be pointed out in the specification hereinafter following by reference to the accompanying drawings in which like characters designate like parts throughout the several views thereof.

Figure 1 is a perspective view of a horse shoe. Fig. 2 is a perspective view of a horse shoe with the elastic calks attached. Fig. 3 is a detail view illustrating one method of attaching the horse shoe calk. Fig. 4 is a detail sectional view taken on line A—A of Fig. 3. Fig. 5 is a view showing one form of a core adapted to be used with a calk preferably with the toe calk. Fig. 6 illustrates the box casing adapted to form a seat for the rubber facing.

It is common in the art of farriery to provide horse shoes with removable calks and toe pieces which are designed particularly to prevent a horse from slipping on slippery or icy roads or streets. It is also common and well known in the art to provide anti-slipping devices comprising chains, boots, etc., that are adapted to fit more or less over the animal's hoof. The sharpened removable calks, are not adapted for use where the animal is being used upon a stage or upon flooring where it is extremely desirable the flooring should not be cut up by the horse's hoofs and the tread of the horse should be noiseless. Where boots or shoes adapted to fit over the animal's hoofs in order to cover sharp steel calks are used to prevent a horse from slipping on a stage, the extra weight attached to the horse's feet for the time being causes the animal to move about in an unnatural manner because of the extra weight being applied for a short time only, and consequently the animal does not become accustomed to this extra weight during the time it is in use on the animal's feet, and the horse acts clumsy.

The invention which will be more particularly described hereinafter, comprises removable calks having a soft elastic face, thereby preventing slipping of the animal upon a stage, or for that matter upon a slippery or icy street, which at the same time are noiseless and do not materially change the weight of the shoe by their addition thereto. As a matter of fact the calk is particularly intended for use as an interchangeable device wherein the elastic calk and toe piece may be substituted for the ordinary sharpened steel calk and toe piece, which of course would be provided with a similar fastening device to that used in connection with the elastic devices, in order that the two may be interchangeable.

Referring to the drawings 2 represents a horseshoe. In this shoe, at about the center of the toe, is a central threaded opening 4 and on each side a smaller opening 5 and 6. Also at each heel is a screw threaded opening 8 and on opposite sides of the opening 8 are openings 10 and 12. Where the shoe is for a small horse or a horse used for light draft or for speed or for trained horses in the ring or on the stage the openings 10 and 12 may be dispensed with in the heel calks.

The removable elastic calk used with this shoe, comprises a core member or plate 14 formed of metal and preferably of brass in order to prevent any danger of rusting of the attaching device in the steel shoe 2. The base 13 of the core is formed screw threaded to engage and coöperate with the threaded opening 4 in the toe or 8 in the heel of the shoe. The upper part of the core member is formed into a rectangular shaped head portion or elongated rib 15 and is provided with flat bent lugs 16 having openings 18 which register with the openings 5 and 6 in the shoe, through said openings the calk is additionally secured to the shoe and thus effectually preventing the calk from turning on its pivot and becoming loosened.

A rubber wear-face or filler 20 is molded and vulcanized over the core 14 in such manner that the core is entirely embedded within the rubber with the exception of the screw and the lugs 16. A box casing 22 is provided with an opening 24 through which the screw threaded base 13 of the core is adapted to extend in such manner that the base of the casing 22 tightly embraces the lower part of the wear face, and the sides 25 of the casing tightly inclose the part of the rubber wear face or filler 20 which extends around the sides of the head.

Both the head and the sides of the box casing are provided with alined openings 26 through which openings and through the openings 11 in the core, rivets 28, are passed which more securely fasten the rubber wear face 20 upon the core and the whole in the casing.

Thus it will be seen that the rubber face 20 is positively and fixedly held in position between the box casing 22 and the core member 15 with rubber projecting above and entirely inclosing the core, whereby it presents an entire rubber face to the tread, and that the lugs 16 connected with the core and the screw 13 serve to hold the calk firmly against the shoe and prevent it in any manner from slipping or the rubber wear face from bending out or giving in any manner but in a perpendicular direction.

Having thus described my invention, what I desire to claim is:—

A removable calk for horseshoes, comprising in combination, an open-ended box having an opening formed centrally in its bottom, a core-plate mounted in said box and consisting of a vertical web extending upwardly from the bottom of said box and parallel to its sides, a shank extending downwardly from said core plate and projecting through said opening in the box bottom, and horizontally disposed lugs extending from the ends of said web and beyond the ends of said box, and a resilient tread molded in said box and around said core-plate, said lugs and shank providing means to attach the calk to a shoe.

In testimony whereof, I affix my signature in the presence of two witnesses.

IDA DUNLAP FERGUSON.

Witnesses:
M. M. CADY,
R. HOEFER.

Copies of this patent may be obtained for five cents each, by addressing the "Commissioner of Patents, Washington, D. C."